United States Patent
Engler et al.

(10) Patent No.: US 11,233,429 B2
(45) Date of Patent: Jan. 25, 2022

(54) ELECTRIC MOTOR WITH TURNABLE ROTOR SEGMENTS FOR REDUCING THE MAGNETIC FLUX

(71) Applicant: SCHAEFFLER TECHNOLOGIES AG & CO. KG, Herzogenaurach (DE)

(72) Inventors: Miriam Engler, Bühl (DE); Peter Schwanemann, Freudenstadt (DE); Matthias Gramann, Renchen (DE); Wolfgang Reik, Bühl (DE); Carsten Angrick, Appenweier (DE)

(73) Assignee: Schaeffler Technologies AG & CO. KG, Herzogenaurach (DE)

(*) Notice: Subject to any disclaimer, the term of this patent is extended or adjusted under 35 U.S.C. 154(b) by 171 days.

(21) Appl. No.: 16/607,596

(22) PCT Filed: Mar. 23, 2018

(86) PCT No.: PCT/DE2018/100259
§ 371 (c)(1),
(2) Date: Oct. 23, 2019

(87) PCT Pub. No.: WO2018/196910
PCT Pub. Date: Nov. 1, 2018

(65) Prior Publication Data
US 2020/0303978 A1     Sep. 24, 2020

(30) Foreign Application Priority Data

Apr. 24, 2017    (DE) ..................... 10 2017 108 670.6

(51) Int. Cl.
*H02K 16/02* (2006.01)
*H02K 1/27* (2006.01)
*H02K 7/04* (2006.01)

(52) U.S. Cl.
CPC ............. *H02K 1/2766* (2013.01); *H02K 7/04* (2013.01)

(58) Field of Classification Search
CPC .. H02K 21/029; H02K 21/028; H02K 1/2766; H02K 16/02
See application file for complete search history.

(56) References Cited

U.S. PATENT DOCUMENTS

| 5,821,710 A | 10/1998 | Masuzawa et al. |
| 7,608,962 B2* | 10/2009 | Franke ................... H02K 16/02 310/114 |
| 2008/0169717 A1 | 7/2008 | Takashima et al. |
| 2010/0164422 A1 | 7/2010 | Shu et al. |
| 2012/0229066 A1 | 9/2012 | Nonaka |
| 2013/0169100 A1* | 7/2013 | Tsai ..................... H02K 1/2766 310/156.38 |

FOREIGN PATENT DOCUMENTS

| DE | 19743314 A1 | 4/1998 |
| DE | 102009060199 A1 | 8/2010 |

* cited by examiner

*Primary Examiner* — Dang D Le
(74) *Attorney, Agent, or Firm* — Rutan & Tucker LLP; Hani Z. Sayed

(57) ABSTRACT

The electrical motor includes a stator and a rotor configured to be rotated about an axis wherein the rotor includes at least three rotor subsegments, wherein a first and second rotor subsegment can be turned relative to one another about the axis in response to a rotation speed range being above a predetermined threshold value of a rotation speed of the electrical machine.

14 Claims, 3 Drawing Sheets

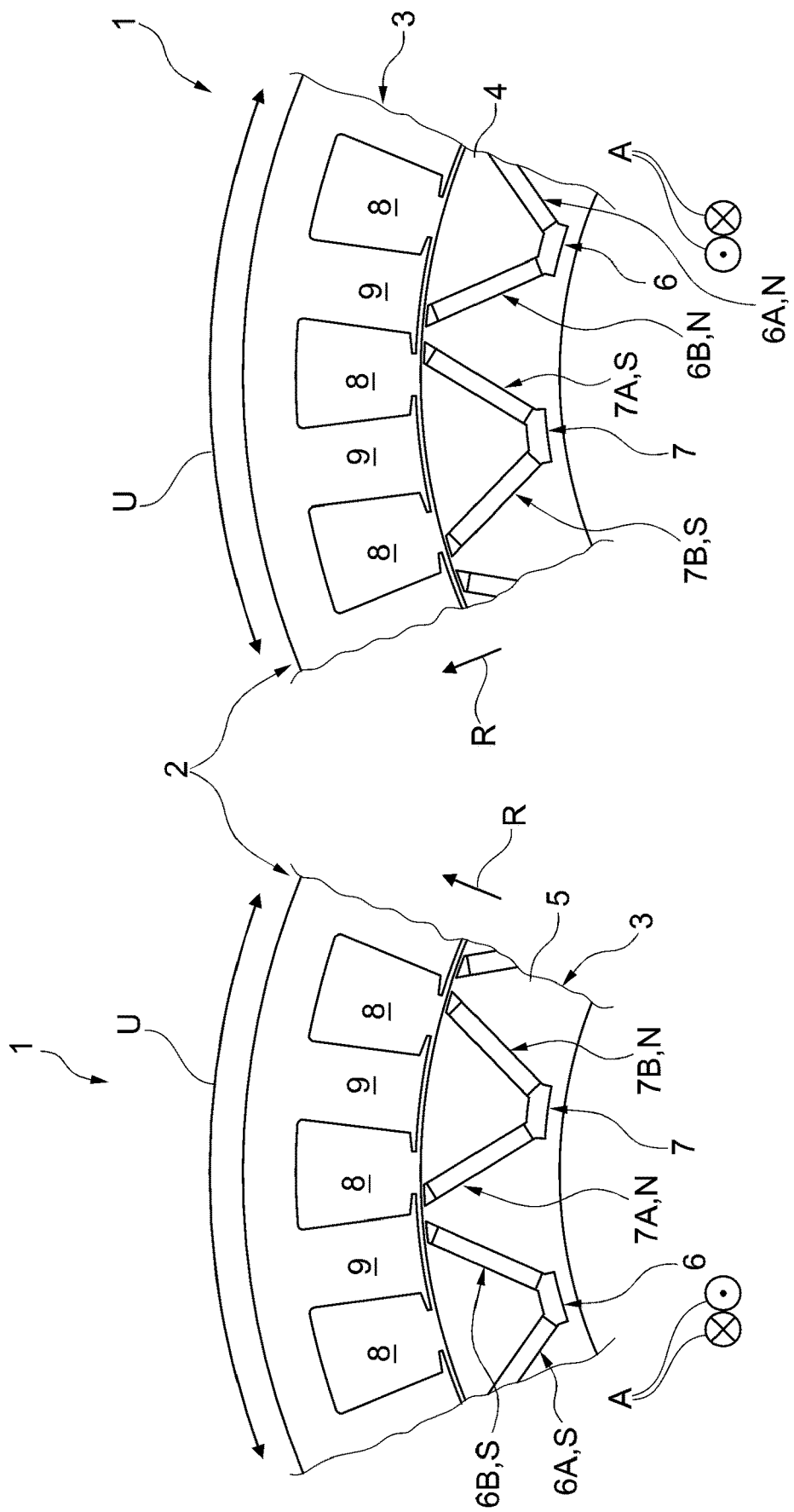

ELECTRIC MOTOR WITH TURNABLE ROTOR SEGMENTS FOR REDUCING THE MAGNETIC FLUX

CROSS-REFERENCE TO RELATED APPLICATIONS

This application is the U.S. National Phase of PCT/DE2018/100259 filed Mar. 23, 2018, which claims priority to DE 10 2017 108 670.6 filed Apr. 24, 2017, the entire disclosures of which are incorporated by reference herein.

TECHNICAL FIELD

The disclosure relates to an electrical machine comprising a stator and a rotor which can be rotated about an axis.

BACKGROUND

DE 197 43 314 A1 discloses an electrical machine which has a stator and a rotor with permanent magnets.

The rotor has two or more axially segmented partial rotors which can be displaced or can be moved in relation to one another. Depending on a rotation speed of the electrical machine, field weakening is carried out by rotation of partial rotors with respect to one another, so that the poles of the partial rotors are displaced relative to one another.

However, a configuration of this type can be used only to a limited extent in high rotation speed ranges of an electrical machine since this generates induced voltages which have to be compensated for with a correspondingly high current so that the machine can actually be operated at this rotation speed and so that damage to the electronics can be avoided.

Therefore, the object of the present disclosure is to specify an electrical machine which can be operated at high speeds or rotation speeds while high induced voltages can be avoided.

SUMMARY

According to the disclosure, this object is achieved by the features of the embodiments disclosed below.

According to the disclosure, an electrical machine comprises a stator and a rotor which can be rotated about an axis.

The rotor may include at least three rotor subsegments, at least two rotor subsegments of which can be turned relative to one another about the axis. Therefore, different relative positionings of the at least two rotor subsegments or the at least two rotor subsegments which can be turned relative to one another are possible.

It is further expedient when the electrical machine comprises a turning device for relatively turning the at least two rotor subsegments which can be turned relative to one another. In this way, relative positionings of the rotor subsegments can be implemented in a simple manner with the aid of the turning device.

It is also expedient when the turning device turns the at least two rotor subsegments, which can be turned relative to one another, relative to one another in a rotation speed range above a predetermined threshold value of a rotation speed of the electrical machine in such a way that effects of the at least two rotor subsegments which can be turned relative to one another may substantially completely cancel each other out.

An overall effect of the electrical machine may then be determined by at least one third rotor subsegment.

As a result, the magnetic effects of the two rotor subsegments which can be turned relative to one another can substantially cancel each other out. A third magnetic pole arrangement of a third rotor subsegment, which third magnetic pole arrangement may have a first and/or second pole (north pole and/or south pole), can further advantageously determine the technical design of the electrical machine above the predetermined threshold value for the rotation speed.

In the present description, the word "substantially" may be understood to mean that complete canceling out of a magnetic field of a magnetic pole arrangement which comprises a first or second pole or a south pole or a north pole or vice versa is not possible. Instead, "substantially" is intended to be understood to mean that the generated magnetic field of a pole or of a magnetic pole arrangement can be reduced to at least 50% of its magnetic strength, to over 80% of its magnetic strength.

As a consequence, high induced voltages can be avoided at high rotation speeds, so that damage in, for example, an electrical drive system can be prevented.

It may be advantageous when the turning device of the electrical machine turns the at least two rotor subsegments, which can be turned relative to one another, relative to one another in such a way that, advantageously after a predetermined threshold value for the rotation speed of the electrical machine is exceeded, a first magnetic pole arrangement of a first rotor subsegment, which first magnetic pole arrangement may have a first pole (for example north pole), is situated opposite, which may be at least partially opposite or expediently entirely opposite, a second magnetic pole arrangement of a second rotor subsegment, which second magnetic pole arrangement may have a second pole (for example south pole), in the direction of the axis. The higher the degree of "opposition" or the more two magnetic pole arrangement of different polarity are situated opposite one another (with respect to the surface area), the greater the canceling out of the magnetic fields generated by said magnetic pole arrangement.

It is also expedient when the at least three rotor subsegments each have a first magnetic pole arrangement with a first pole (for example north pole or south pole) and a second magnetic pole arrangement with a second pole (for example south pole or north pole).

It is advantageous here when the first magnetic pole arrangement and the second magnetic pole arrangement alternate in a circumferential direction of the rotor.

Each magnetic pole arrangement, in particular the first magnetic pole arrangement and/or the second magnetic pole arrangement, may have at least two magnetic bodies.

Said magnetic bodies expediently form a V-shaped arrangement or a spoke arrangement in the rotor. The magnetic flux can be guided axially within the rotor in this way.

It is further possible for at least one or at least two of the magnetic bodies to be inclined with respect to a radial direction of the rotor.

Provision can also be made for at least one of the magnetic bodies to form an angle of between +/−10 to +/−60 degrees, between +/−20 and +/−50 degrees, or between +/−35 and +/−45 degrees, with the radial direction of the rotor.

Furthermore, a first magnetic pole arrangement of a first rotor subsegment, which first magnetic pole arrangement has a first pole (for example north pole), may be situated opposite a second magnetic pole arrangement of a second rotor subsegment, which second magnetic pole arrangement has a second pole (for example south pole), in the direction of the axis. In this way, opposite magnetic pole or pole arrangements can mutually cancel each other out, as a result of which high induced voltages can be avoided at high rotation speeds.

Between the first magnetic pole arrangement and the second magnetic pole arrangement, a passage area may concentrate a magnetic flux in the direction of the axis and advantageously substantially suppresses a magnetic flux in a direction through the stator. As a consequence, high induced voltages can be avoided.

The at least two rotor subsegments can be turned relative to one another have an identical width. Therefore, the magnetic forces of said two rotor subsegments can be compensated for in a simple manner when the magnets or poles are of similar size and/or strength. Mechanical unbalances can also be avoided in this way.

Furthermore, it is advantageous when the turning device has a switchable electromagnet may carry out the turning operation in such a way that one of the at least two rotor subsegments which can be turned relative to one another is offset in the direction of the axis, may then turn through a predetermined angle and expediently then repositioned in an opposite direction to the offsetting operation. In this way, a simple switching process can be carried out with the aid of the turning device.

It is also advantageous when the turning device turns the at least two rotor subsegments, which can be turned relative to one another, relative to one another in a rotation speed range below a predetermined threshold value of a rotation speed of the electrical machine in such a way that effects of the at least two rotor subsegments which can be turned relative to one another preferably do not substantially completely cancel each other out. As a result, the effects or the magnetic effects of the two rotor subsegments which can be turned relative to one another cannot substantially completely cancel each other out. In this context, it is further expedient for an overall effect of the electrical machine to be determined by the at least two rotor subsegments which can be turned relative to one another and by the at least one third rotor subsegment.

It is also advantageous when the turning device carries out the relative turning of the at least two rotor subsegments which can be turned relative to one another in predetermined steps or continuously. A variety of magnetic positioning scenarios of the individual rotor subsegments in relation to one another can be realized in this way.

The concept of the disclosure outlined above will be expressed in a supplementary manner with different words in the text which follows.

This concept may relate—illustrated in a simplified manner—to an electrical machine with magnets in the rotor, which electrical machine can be operated in a simple manner at high rotation speeds.

Conventional electric motors with magnets in the rotor have, in contrast to other motor topologies (asynchronous motor, externally excited motors, reluctance motors), the disadvantage that very high induced voltages are produced at high rotation speeds.

However, in electrical machines with magnets in the rotor, a relatively high current has to be applied solely for the purpose of compensating for the high induced voltage at high rotation speeds. In other words, it is necessary in the above-described configuration to operate the motor in field weakening mode at high rotation speeds.

In the event of a fault, impermissibly high voltages can additionally be produced at high rotation speeds and can lead to damage in the electrical drive system or another system which forms part of the on-board electrical system.

Therefore, according to the disclosure, an electrical machine has a stator and a rotor which can rotate about an axis, wherein the rotor may have at least three rotor subsegments, at least two rotor subsegments of which can expediently be turned relative to one another about the axis.

In this case, it is advantageous when the electrical machine comprises a turning device for relatively turning the at least two rotor subsegments which can be turned relative to one another.

The turning device may turn the at least two rotor subsegments, which can be turned relative to one another, relative to one another in a rotation speed range above a predetermined threshold value of a rotation speed of the electrical machine in such a way that effects of the at least two rotor subsegments which can be turned relative to one another substantially completely cancel each other out and an overall effect of the electrical machine is determined by at least one third rotor sub segment.

If, for example, a rotor subsegment is now offset by exactly one pole relative to a further rotor subsegment, the field lines may no longer close over the radial and tangential path across the stator, but rather in the axial direction or in the direction of the axis/rotation axis of the electrical machine largely within the rotor.

Therefore, the magnetomotive force of the stator can be considerably reduced, as a result of which the induced voltage can be reduced to a permissible value, as a result of which a safe state can be achieved in turn.

An only partial interleaving may lead to it being possible to reduce the field weakening current, this increasing the efficiency of the drive system.

Some more features of the present disclosure are as follows:

deflection of the radial flux in the axial direction or in the direction of the axis/rotation axis and field weakening accompanying this; this may produce, as a consequence, an electric motor or an electrical machine with 3D flux guidance;

turning of the rotor subsegments in relation to one another may be performed by a suitable mechanism or by a turning device, for example, with the aid of a kind of magnetic brake; in other words, it may be when a switchable magnet or a turning device pulls a rotor subsegment slightly away from the other rotor subsegments in the direction of the rotation axis, turns said rotor subsegment through the desired angle and allows said rotor subsegment to snap back onto the rotor.

BRIEF DESCRIPTION OF THE DRAWINGS

The disclosure will be explained in more detail below with reference to an exemplary embodiment in conjunction with associated drawings, in which:

FIG. 3 schematically shows a plan view of a front rotor subsegment from FIGS. 1 and 2; and FIG. 4 schematically shows a plan view of a rear rotor subsegment from FIGS. 1 and 2.

DETAILED DESCRIPTION

In the following description, the same reference signs are used for identical objects.

Figure 1:
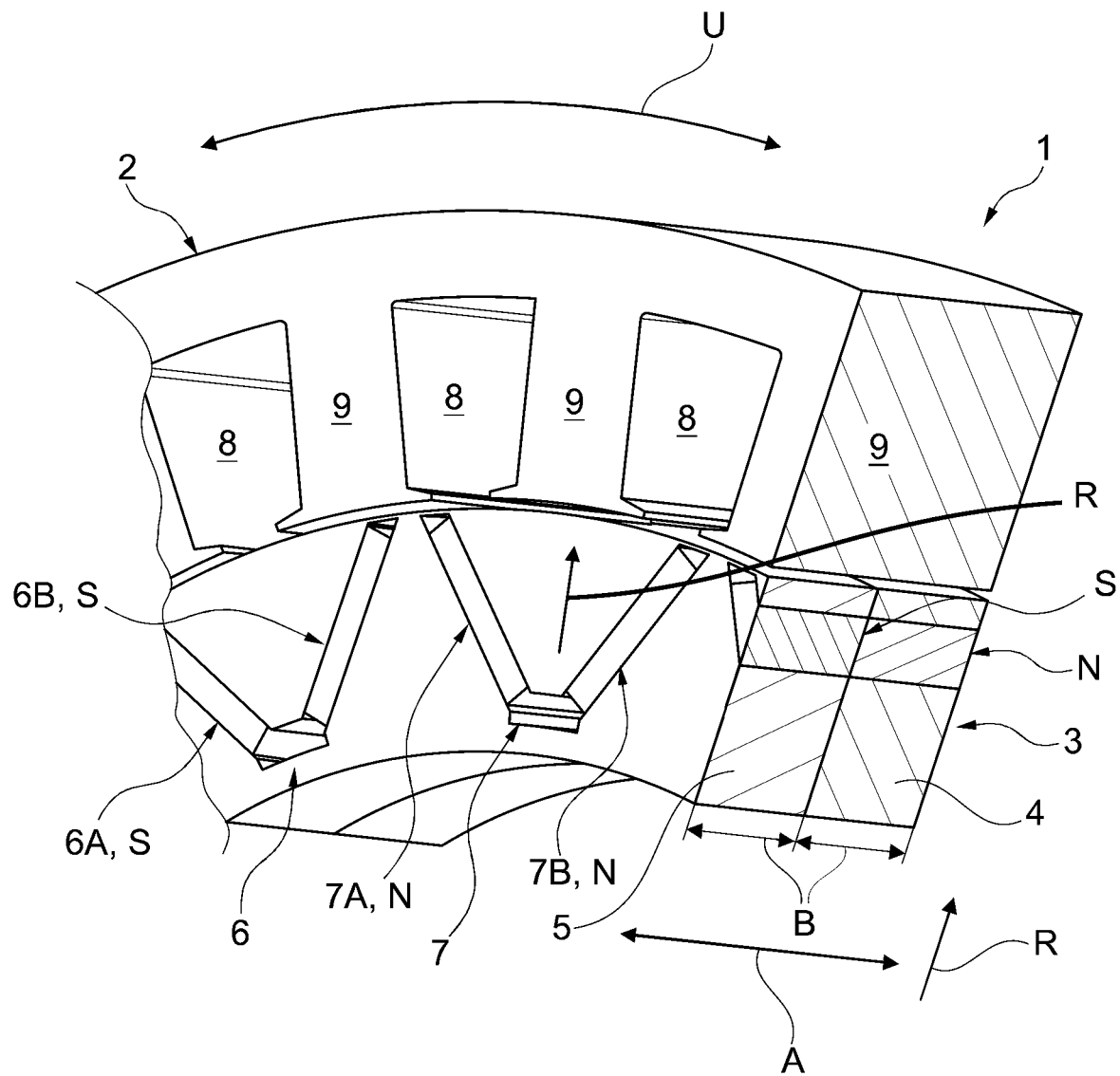
FIG. 1 schematically shows a three-dimensionally sectioned portion of an electrical machine comprising a rotor and a stator.

FIG. 1 shows a three-dimensionally sectioned portion of an electrical machine 1 comprising a rotor 3 and a stator 2.

More precisely illustrated, FIG. 1 shows an electrical machine 1 comprising a stator 2 and a rotor 3 which can be rotated about an axis A.

In this case, the rotor 3 has three rotor subsegments, only two rotor subsegments 4, 5 of which are illustrated; the third rotor subsegment adjoins either the rotor subsegments 4 or the rotor subsegments 5.

The two rotor subsegments 4, 5 can be turned relative to one another about the axis A.

A turning device serves to relatively turn the two rotor subsegments 4, 5 which can be turned relative to one another.

Said turning device turns the two rotor subsegments 4, 5, which can be turned relative to one another, relative to one another in a rotation speed range above a predetermined threshold value of a rotation speed of the electrical machine 1 in such a way that effects of the two rotor subsegments 4, 5 which can be turned relative to one another substantially completely cancel each other out and an overall effect of the electrical machine 1 is determined by a third rotor subsegment.

FIG. 1 further shows that the rotor subsegments 4, 5, but also the third rotor subsegment, each have a first magnetic pole arrangement 6 with a first pole N and a second magnetic pole arrangement 7 with a second pole S. In this case, the first magnetic pole arrangement 6 and the second magnetic pole arrangement 7 alternate circumferential direction U of the rotor 3 or of the rotor subsegments 4, 5.

To once again express the above substantive matter in different words or to illustrate said substantive matter more precisely, the turning device is able to turn the two rotor subsegments 4, 5, which can be turned relative to one another, relative to one another.

Specifically, the rotor subsegments 4, 5 can be turned by the turning device in such a way that, after a predetermined threshold value for the rotation speed of the electrical machine 1 is exceeded, a first magnetic pole arrangement 6 of the first rotor subsegment 4, which first magnetic pole arrangement has a first pole N, is situated opposite a second magnetic pole arrangement 7 of the second rotor subsegment 5, which second magnetic pole arrangement has a second pole S, in the direction of the axis A.

In this way, the magnetic effects of the two rotor subsegments 4, 5 substantially cancel each other out and a third magnetic pole arrangement of a third rotor subsegment, which third magnetic pole arrangement has a first or second pole N, S, determines the technical design of the electrical machine 1.

The turning device has a switchable electromagnet which carries out the turning operation in such a way that one of the two rotor subsegments 4, 5 which can be turned relative to one another is offset in the direction of the axis. A, then turned through a predetermined angle and repositioned in an opposite direction to the offsetting operation.

As is clearly shown in FIG. 1, each of the magnetic pole arrangements 6, 7 has two magnetic bodies 6A, 6B and, respectively, 7A, 7B. Said magnetic bodies form a V-shaped arrangement in the rotor 3.

Outlined in other words, the magnetic bodies 6A, 6B and, respectively, 7A, 7B are inclined with respect to a radial direction R of the rotor 3.

In respect of the inclination, it should be noted that each of the magnetic bodies 6A, 6B; 7A, 7B forms an angle of between +/−39 and +/−41 degrees with the radial direction R of the rotor 3.

As further shown in FIG. 1, the two rotor subsegments 4, 5 which can be turned relative to one another have an identical width B.

Figure 2:
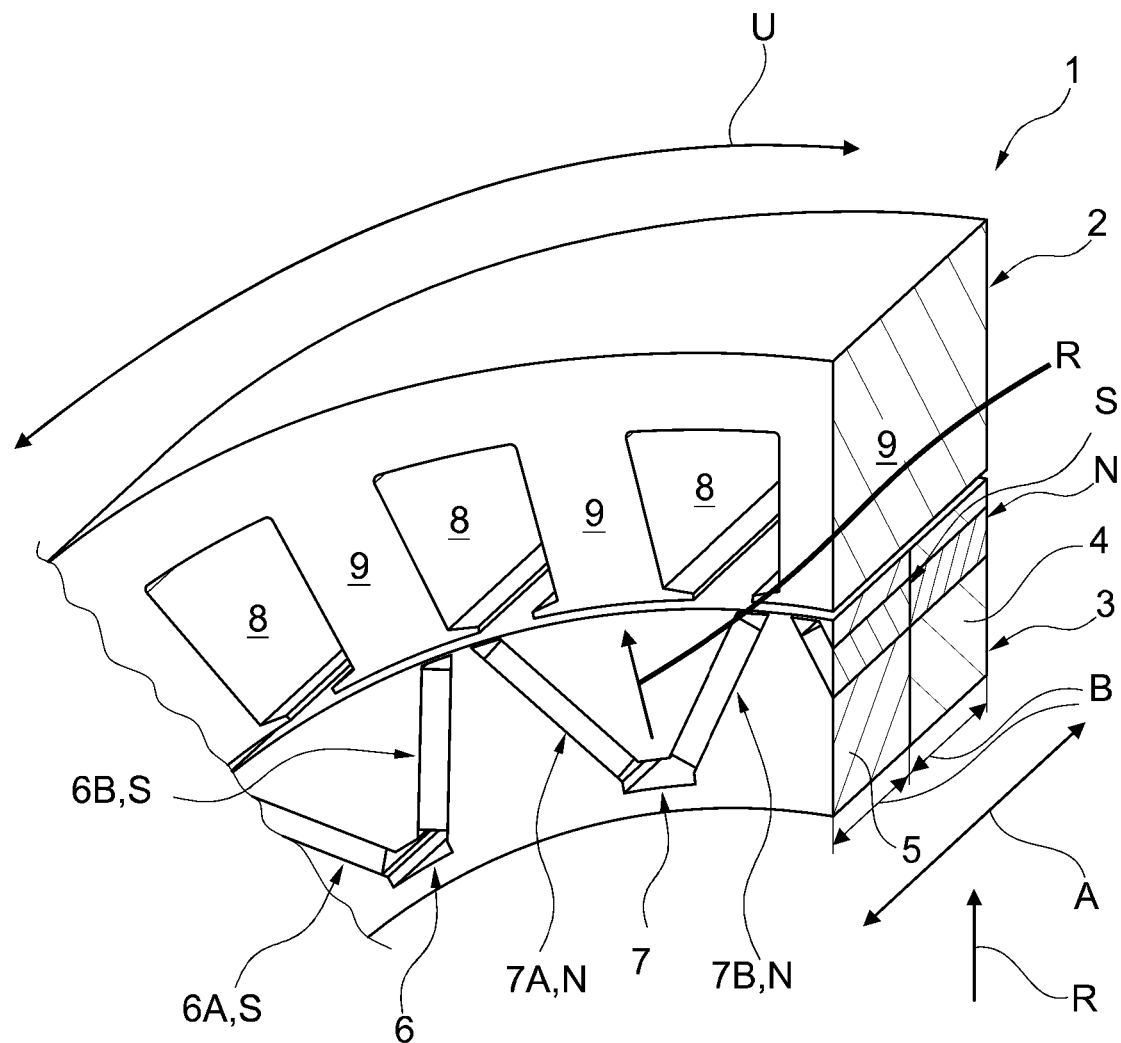
FIG. 2 schematically shows a three-dimensionally sectioned portion of an electrical machine comprising a rotor and a stator in a perspective offset in comparison to FIG. 1.

FIG. 2 shows, similarly to FIG. 1, a three-dimensionally sectioned portion of the electrical machine 1 comprising the rotor 3 and the stator 2, but in a perspective offset in comparison to FIG. 1.

In respect of the further statements, reference is made to the statements relating to FIG. 1, which can be applied analogously here, in order to avoid unnecessary repetition.

Therefore, only supplementary information which likewise applies to FIG. 1 is found below.

Therefore, FIGS. 1 and 2 show the stator 2 which has a plurality of slots 8 or cutouts for winding and also a variety of teeth 9 or flux guides.

Whereas FIG. 3 illustrates a plan view of a front rotor subsegment or of the rotor subsegment 5 from FIGS. 1 and 2, FIG. 4 shows a plan view of a rear rotor subsegment or of the rotor subsegment 4, likewise shown in FIGS. 1 and 2.

In respect of the further statements, reference is made to the statements relating to FIGS. 1 and 2, which can be analogously applied to FIGS. 3 and 4 here, in order to avoid unnecessary repetition.

Therefore, supplementary information which likewise applies to FIGS. 1 and 2 is found below.

Therefore, FIGS. 3 and 4 show that a first magnetic pole arrangement 6 of the first rotor subsegment 4, which first magnetic pole arrangement has a first pole N, is respectively situated opposite a second magnetic pole arrangement 7 of the second rotor subsegment 4, which second magnetic pole arrangement has a second pole S, in the direction of the axis A.

As a consequence, a passage area which concentrates a magnetic flux in the direction of the axis A is in each case produced between the first magnetic pole arrangements 6 and the second magnetic pole arrangements 7. As a result, a magnetic flux in the direction through the stator 2 is substantially suppressed.

It is of course also possible for the turning device to turn the two rotor subsegments 4, 5, which can be turned relative to one another, relative to one another in a rotation speed range below a predetermined threshold value of a rotation speed of the electrical machine 1 in such a way that magnetic effects of the two rotor subsegments 4, 5 which can be turned relative to one another do not substantially completely cancel each other out.

Consequently, an overall effect of the electrical machine 1 is determined by the two rotor subsegments 4, 5 which can be turned relative to one another and by the third rotor sub segment.

Furthermore, it should be noted that the turning device can carry out the relative turning of the two rotor subsegments 4, 5 which can be turned relative to one another in predetermined steps or continuously.

LIST OF REFERENCE SYMBOLS

1 Electrical machine
2 Stator
3 Rotor
4 First rotor subsegment
5 Second rotor subsegment
6 First magnetic pole arrangement
6A Magnetic body
6B Magnetic body
7 Second magnetic pole arrangement
7A Magnetic body 7B Magnetic body
8 Slot/Cutout for winding
9 Tooth/Flux guide for stator
A Axis/Rotation axis
B Width
N First pole
S Second pole
R Radial direction
U Circumferential direction

The invention claimed is:

1. An electrical machine comprising:
a stator comprising a plurality of flux guides;
a rotor which can be rotated about an axis;
the rotor comprising three rotor subsegments, wherein at least two rotor subsegments of which can be turned relative to one another about the axis; and
wherein the at least two rotor subsegments can be turned relative to one another about the axis;
wherein after a predetermined threshold value for a rotation speed of the electrical machine is exceeded, a first magnetic pole arrangement comprising a first pole of a first rotor subsegment, is disposed opposite to a second magnetic pole arrangement of a second rotor subsegment comprising a second pole;
and wherein the at least three rotor subsegments each comprise a pair of magnetic bodies; wherein the pair of magnetic bodies are inclined with respect to a radial direction of the rotor.

2. The electrical machine of claim 1, wherein the first and second magnetic pole arrangements alternate in a circumferential direction of the rotor.

3. The electrical machine of claim 2, wherein each magnetic body form a V-shaped arrangement.

4. The electrical machine of claim 3, wherein at least one of the magnetic bodies forms an angle of between +/−10 to +/−60 degrees with radial direction of the rotor.

5. The electrical machine of claim 1, wherein magnetic flux is suppressed in a direction through the stator.

6. The electrical machine of claim 5, wherein the at least two rotor subsegments which can be turned relative to one another have an identical width.

7. The electrical machine of claim 1, wherein a turning device carries out the relative turning of the at least two rotor subsegments which can be turned relative to one another in predetermined steps or continuously.

8. An electrical machine having:
a stator comprising a plurality of teeth; and
a rotor configured to be rotated about an axis wherein the rotor includes at least three rotor subsegments, wherein a first and second rotor subsegment can be turned relative to one another about the axis relative to one another in a rotation speed range above a predetermined threshold value of a rotation speed of the electrical machine in a manner that a magnetic effect of the first and second rotor subsegment cancel each other out;
wherein the at least three rotor subsegments each comprise a pair of magnetic bodies; and wherein the pair of magnetic bodies are inclined with respect to a radial direction of the rotor.

9. The electrical machine of claim 8, wherein the rotor includes a third rotor subsegment that determines an overall effect of the electrical machine.

10. The electrical machine of claim 8, wherein a third rotor subsegment includes a third magnetic pole arrangement that includes a first and second pole.

11. The electrical machine of claim 8, wherein the first and second rotor subsegments each have a first magnetic pole arrangement with a first pole and a second magnetic pole arrangement with a second pole, wherein the first and second magnetic pole arrangements alternate in a circumferential direction of the rotor.

12. The electrical machine of claim 8, wherein the first and second rotor subsegments include magnetic bodies form a V-shaped arrangement in the rotor.

13. An electrical motor comprising:
a stator comprising a variety of teeth; and
a rotor configured to be rotated about an axis wherein the rotor includes at least three rotor subsegments, wherein a first and second rotor subsegment can be turned relative to one another about the axis in response to a rotation speed range being above a predetermined threshold value of a rotation speed of the electrical motor;
wherein the electrical motor includes a first magnetic pole arrangement of the first rotor subsegment situated opposite a second magnetic pole arrangement of the second rotor subsegment in a direction of the axis, wherein the first magnetic pole arrangement has a first pole and the second magnetic pole arrangement has a second pole;
and wherein each of the at least three rotor subsegments comprise a pair of magnetic bodies that are inclined with respect to a radial direction of the rotor.

14. The electrical motor of claim 13, wherein the first and second rotor subsegments are configured to turn relative to one another to cancel a magnetic force of each rotor subsegment out and a magnetic effect of the electrical motor.

* * * * *